UNITED STATES PATENT OFFICE.

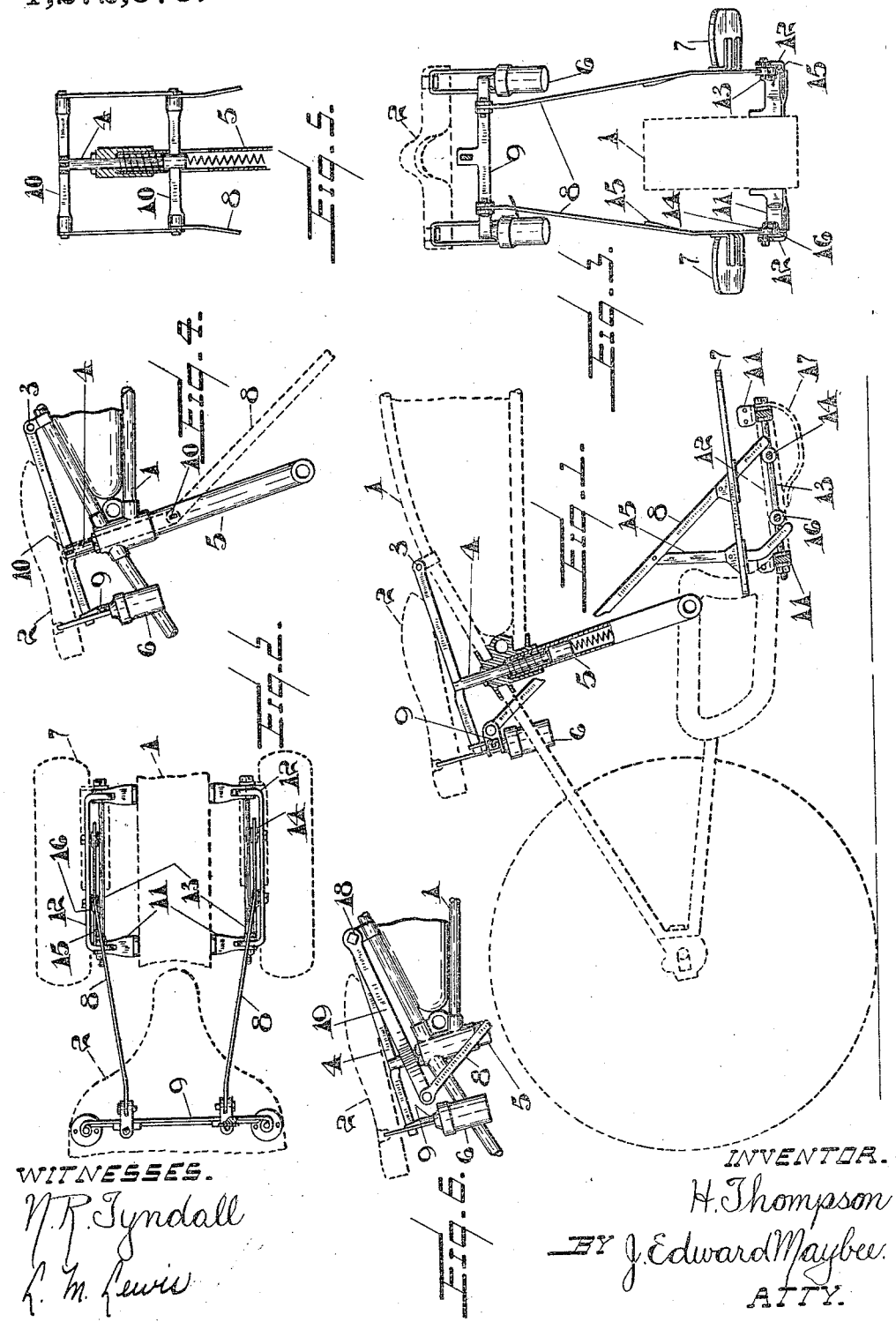

HERBERT THOMPSON, OF TORONTO, ONTARIO, CANADA.

AUTOMATIC FOOT-REST SHOCK-ABSORBER.

1,272,575. Specification of Letters Patent. Patented July 16, 1918.

Application filed April 10, 1917. Serial No. 161,020.

*To all whom it may concern:*

Be it known that I, HERBERT THOMPSON, of the city of Toronto, in the county of York, Province of Ontario, Canada, have invented certain new and useful Improvements in Automatic Foot-Rest Shock-Absorbers, of which the following is a specification.

In motorcycles, the saddle and foot rests are separately supported on the frame of the cycle and as the seat is spring supported the distance between the saddle and the foot rests constantly and rapidly varies, resulting in a disagreeable jarring of the feet and legs, which is accentuated owing to the foot rests being rigidly connected to the frame, and my object is to devise a suitable construction to obviate the trouble referred to.

I attain my object by supporting the foot rests from a part partaking in the up and down movements of the saddle, the supports for the foot rests being suitably guided on the frame of the cycle to take care of lateral and fore-and-aft strains, and the whole constructed in detail substantially as hereinafter more specifically described and illustrated in the accompanying drawings in which—

Figure 1 is a side elevation of part of a motorcycle showing the saddle and foot rests constructed in accordance with my invention;

Fig. 2 a plan view of the same parts;

Fig. 3 a front elevation of the same parts;

Fig. 4 a detail in side elevation showing a modification of the connection between the foot rests and saddle;

Fig. 5 a rear elevation partly in section of the same parts; and

Fig. 6 a view similar to Fig. 4 showing a further modification.

In the drawings like numerals of reference indicate corresponding parts in the different figures.

1 indicates part of the frame of a motorcycle, which may be of any preferred construction. 2 is the saddle which may be resiliently supported in any suitable manner. I show one well known form in the drawings. In this form the saddle frame is pivoted at 3 on the cycle frame and is connected to a stem 4 slidable in the saddle post member 5 of the cycle frame, the usual coil springs being employed to give the necessary resiliency.

The saddle frame is also shown as provided with shock absorbers 6 of ordinary construction.

7 are foot rests. These foot rests in my construction are connected with any suitable part which is diagonally movable with or by the saddle. In Fig. 1, I show connecting members 8 to which the foot rests are secured and the upper ends of which are connected with a transverse member 9 of the saddle frame. The connection will usually be a pivotal one.

In Figs. 4 and 5 I show a modification in which the connecting members 8 are secured to one or more transverse members 10 connected to the saddle post. If the lower member 10 be employed, it is necessary to slot the saddle post member 5 and the frame for its passage.

A further modification is shown in Fig. 6. The pivot 18 of the saddle frame is connected rigidly to the frame and rotates in its bearings. To the outer ends of this pivot are secured the arms 19 extending rearwardly and to the ends of these arms the connecting members 8 of the foot rests are connected. It is evident that the arms 19, and consequently the foot rests, move with the saddle, so that the foot rests are resiliently supported on the same springs as the saddle.

Other arrangements might also be employed to provide a part movable with the saddle to which the connecting members 8 may be connected.

Suitable means must be provided to guide the lower ends of the connecting members 8, principally to resist strains in a fore-and-aft direction. I show a preferred construction in Figs. 1, 2 and 3 of the drawings. To brackets 11 secured to the frame of the cycle, I connect a guide bar 12. The brackets are preferably formed as jaws to receive the inwardly turned ends of the guide member and these ends are secured in the jaws by means of the bolts 13. The bolts and guide members thus form slots through which the lower ends of the connecting members extend.

Suitably journaled on the guide members are the anti-friction rollers 14 which are engaged by the rear sides of the connecting members. These rollers thus take any rearward strain on the lower ends of the connecting members caused by the pressure of the feet on the foot rests.

Each foot rest is braced from the connecting member by a brace member 15. The lower end of this brace member is bent forwardly substantially parallel to the lower end of the connecting member and engages the rear side of the anti-friction roller 16. Thus any strain tending to produce a forward movement of the foot rest is resisted.

As there is considerable downward movement of the lower ends of the connecting members and braces, I prefer to secure to the forward bracket 11 a guard 17.

From the construction described it is evident that the foot rests are resiliently supported and move with the saddle, so that when the machine is running the riding shocks do not cause any movement of the feet relative to the body, which conduces to comfort and ease in riding.

What I claim as my invention is:—

1. In a motorcycle, the combination of a saddle resiliently supported on the frame in a position between the wheels; a member partaking of the vertical movements of the saddle; a pair of connecting members independent of the saddle supporting means and straddling the cycle frame and connected to said vertical movable member; a slotted guide at each side of the frame for the lower end of each connecting member, in which guide the member is capable only of movement substantially in the direction of its length; and a foot rest secured to each connecting member and supported solely thereby.

2. In a motorcycle, the combination of a saddle resiliently supported on the frame in a position between the wheels; a member partaking of the vertical movements of the saddle; a pair of connecting members independent of the saddle supporting means and straddling the cycle frame and connected to said vertical movable member; a brace member connected to each connecting member having its lower end substantially parallel to the lower end of the connecting member; a guide member at each side of the frame slotted in a fore-and-aft direction for the passage of the connecting member and braces and adapted to confine the connecting and brace members to movement substantially in the direction of the length of said connecting member; and a foot rest secured to each connecting member and supported solely thereby.

3. In a motorcycle, the combination of a saddle resiliently supported on the frame in a position between the wheels; a member partaking of the vertical movements of the saddle; a pair of connecting members independent of the saddle supporting means and straddling the cycle frame and connected to said vertical movable member; guiding means on the frame for each connecting member restricting it substantially to vertical movements only comprising a guide member slotted in a fore-and-aft direction for the passage of the connecting member, and an anti-friction roller journaled in said slot against which the rear side of the connecting member rests; and a foot rest secured to each connecting member and supported solely thereby.

4. In a motor cycle, the combination of a saddle resiliently supported on the frame in a position between the wheels; a member partaking of the vertical movements of the saddle; a pair of connecting members independent of the saddle supporting means and straddling the cycle frame and connected to said vertical movable member; a brace member connected to each connecting member having its lower end substantially parallel to the lower end of the connecting member; anti-friction rollers journaled on the frame of the cycle and engaged by the connecting members and brace members to resist fore-and-aft strains on the connecting members; and a foot rest at each side secured to the corresponding connecting member and brace and supported solely thereby.

5. In a motorcycle, the combination of a saddle resiliently supported on the frame in a position between the wheels; a member partaking of the vertical movements of the saddle; a pair of connecting members independent of the saddle supporting means and straddling the cycle frame and connected to said vertical movable member; a brace member connected to each connecting member having its lower end substantially parallel to the lower end of the connecting member; a guide member at each side of the frame slotted in a fore-and-aft direction for the passage of the connecting members and braces; anti-friction rollers journaled in said slots and engaged by the connecting members and brace members to resist fore-and-aft strains on said connecting members; and a foot rest at each side connected solely to the corresponding connecting member and brace and supported solely thereby.

Signed at Toronto, Canada, this 3rd day of April, 1917.

HERBERT THOMPSON.

Copies of this patent may be obtained for five cents each, by addressing the "Commissioner of Patents, Washington, D. C."